March 16, 1943.                D. K. POPE                2,314,287
                            BALANCING MACHINE
                          Filed Sept. 2, 1939              3 Sheets-Sheet 1

Inventor
DEMETRIOS K. POPE
By
Attorneys

March 16, 1943.  D. K. POPE  2,314,287
BALANCING MACHINE
Filed Sept. 2, 1939    3 Sheets-Sheet 2
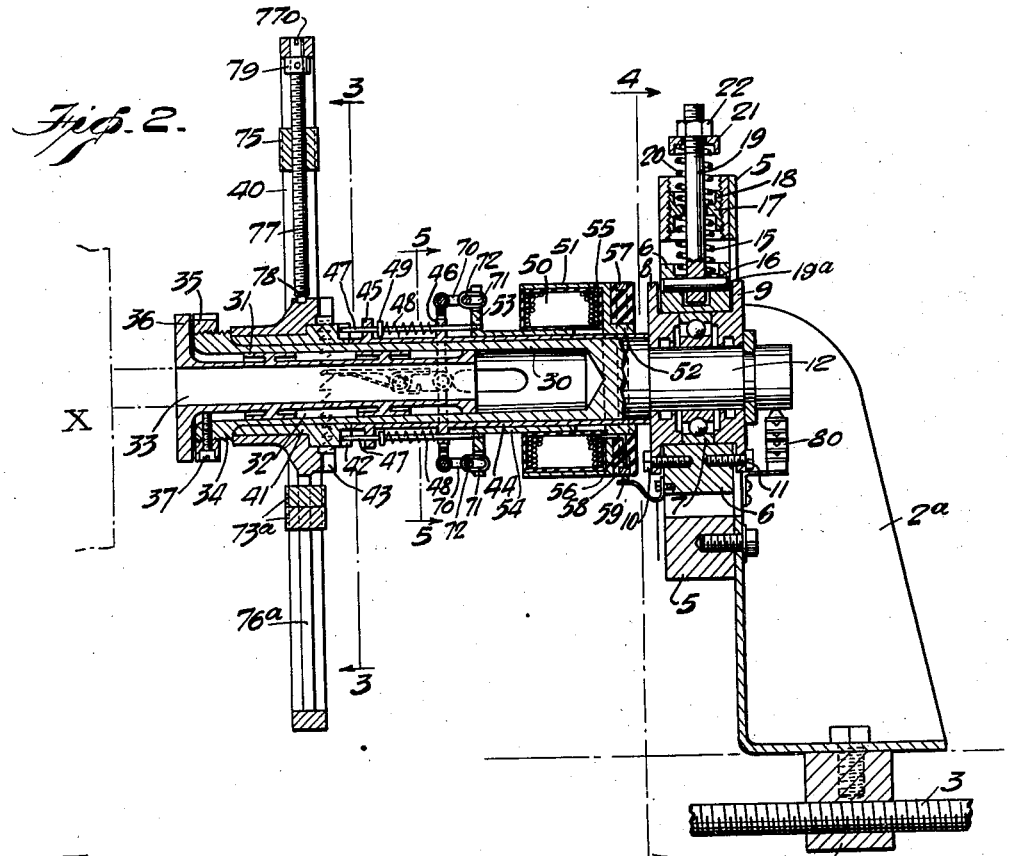
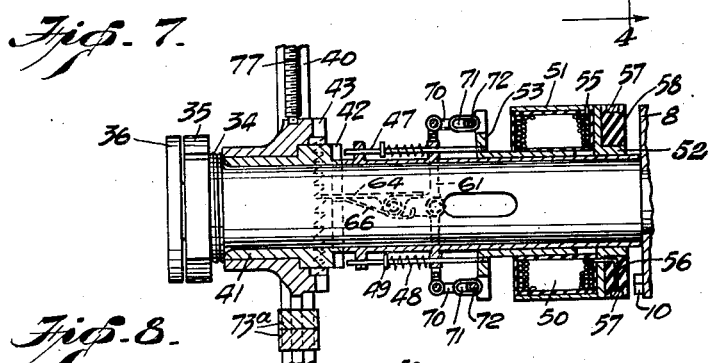
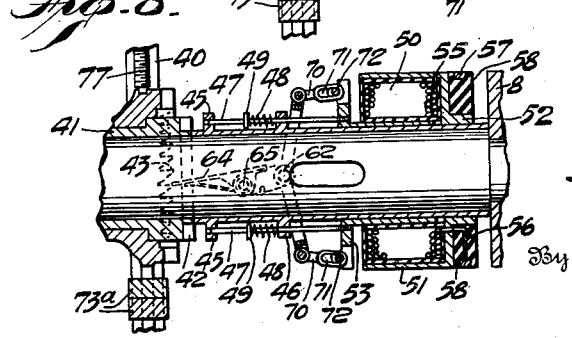
Inventor
DEMETRIOS K. POPE
By Norris L. Bateman
Attorneys March 16, 1943.  D. K. POPE  2,314,287
BALANCING MACHINE
Filed Sept. 2, 1939  3 Sheets-Sheet 3
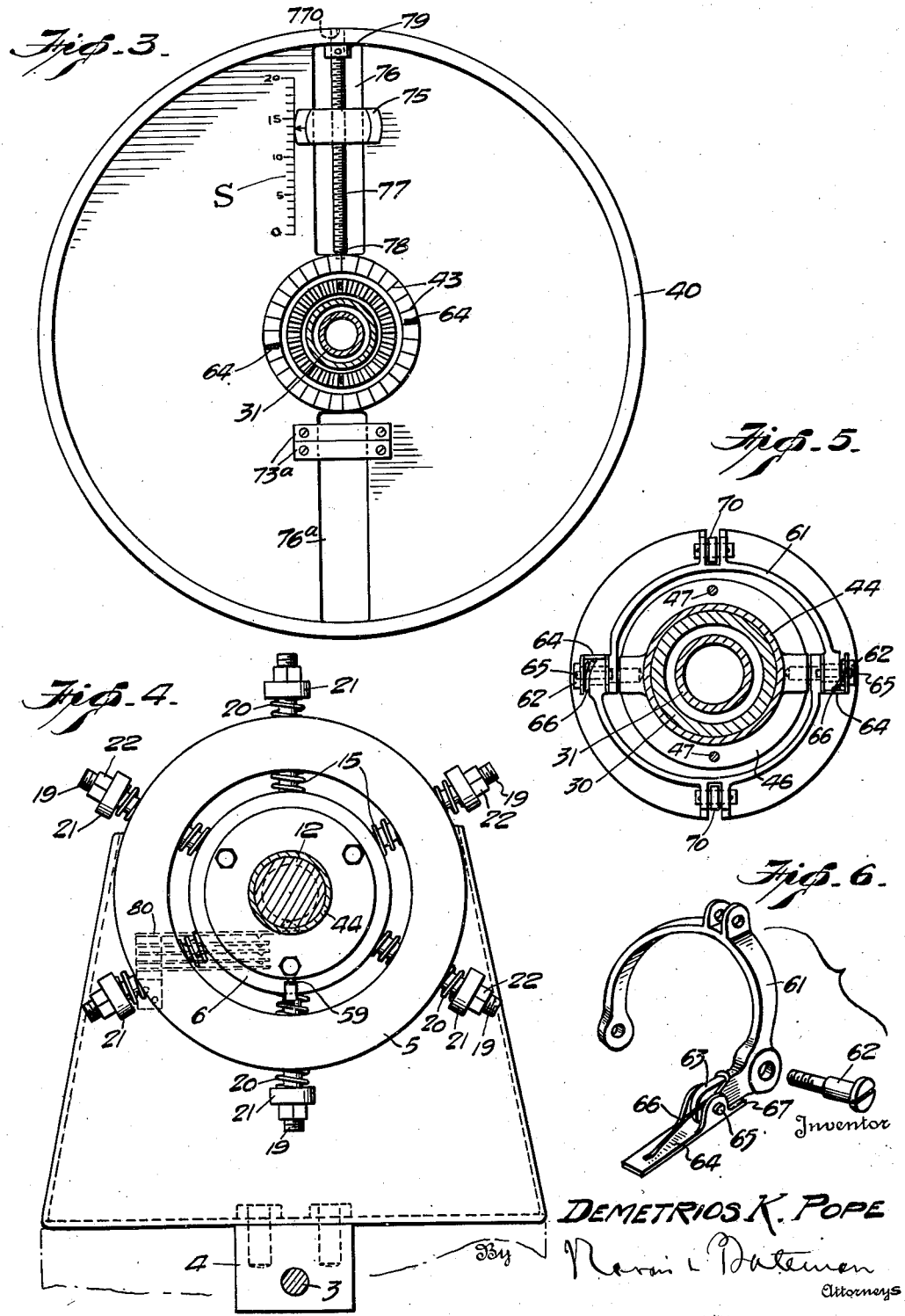
Demetrios K. Pope
Inventor Patented Mar. 16, 1943

2,314,287

UNITED STATES PATENT OFFICE 2,314,287

BALANCING MACHINE

Demetrios K. Pope, Gary, Ind.

Application September 2, 1939, Serial No. 293,283

11 Claims. (Cl. 73—53)

The present invention relates to improvements in balancing machines, and more especially, means for testing for dynamic balance rotatable bodies, such for example as armatures of electric motors and generators, pulleys and other parts which, in operation, revolve at relatively high speeds, and which, if unbalanced dynamically, cause noise and vibration, undue wear in bearings, and other objections.

One of the primary objects of the invention is to provide a relatively simple and improved machine for determining whether rotatable bodies are balanced dynamically with respect to the axes upon which they are designed to rotate, and for indicating whether they are unbalanced dynamically and toward one or the other end thereof and the amount of such unbalance, thus enabling the amount of correction weight required to be added or removed, and toward which end of the body to balance it, to be determined quickly and with facility.

Another object is to provide a machine of this class which enables a variable amount of counterbalancing weight to be brought into action upon the rotating body to balance it dynamically, and to provide novel and improved means for relatively rotating the body and the counterbalancing weight, while the balancing machine is in operation and the body is rotating, to determine the radius of the body on which it is unbalanced dynamically, and for testing the rotating body while its unbalanced condition is compensated for by the counterbalancing weight in the balancing machine, thereby enabling the radius of unbalance of the body and the amount thereof to be easily and quickly determined.

Another object is to provide novel yieldable mountings for spindles supporting the ends of the rotating body in the balancing machine so that it may revolve freely on the axis of its center of mass, and thus oscillate or vibrate relatively to the axis on which it is designed to rotate, the mounting being provided with means for varying the load sustaining capacity thereof according to varying weights of the rotatable bodies to be tested, thus widening the range of operation of the machine.

To these and other ends, the invention consists in certain improvements and combinations and arrangements of parts all as will be hereinafter more fully described, the features of novelty being pointed out more particularly in the claims at the end of this specification.

In the accompanying drawings:

Fig. 2 is a longitudinal section taken vertically through one end of the machine, showing the balancing disk in its normal locked condition;

Fig. 3 is a vertical section, taken on the line 3—3 in Fig. 2;

Fig. 4 is a vertical section taken on the line 4—4 in Fig. 2;

Fig. 5 is a vertical section taken on the line 5—5 in Fig. 2;

Fig. 6 is a detail perspective view showing collectively one of the ratchet devices for rotating one of the balancing disks relatively to the body under test;

Fig. 7 is a detail longitudinal section showing the ratchet devices and their actuating solenoid for rotating the respective balancing disk, showing the disk unlocked and the ratchet devices about to operate;

Fig. 8 is a view similar to Fig. 7, but showing the ratchet devices after actuation thereof.

Similar parts are designated by the same reference characters in the several figures.

Figure 1:
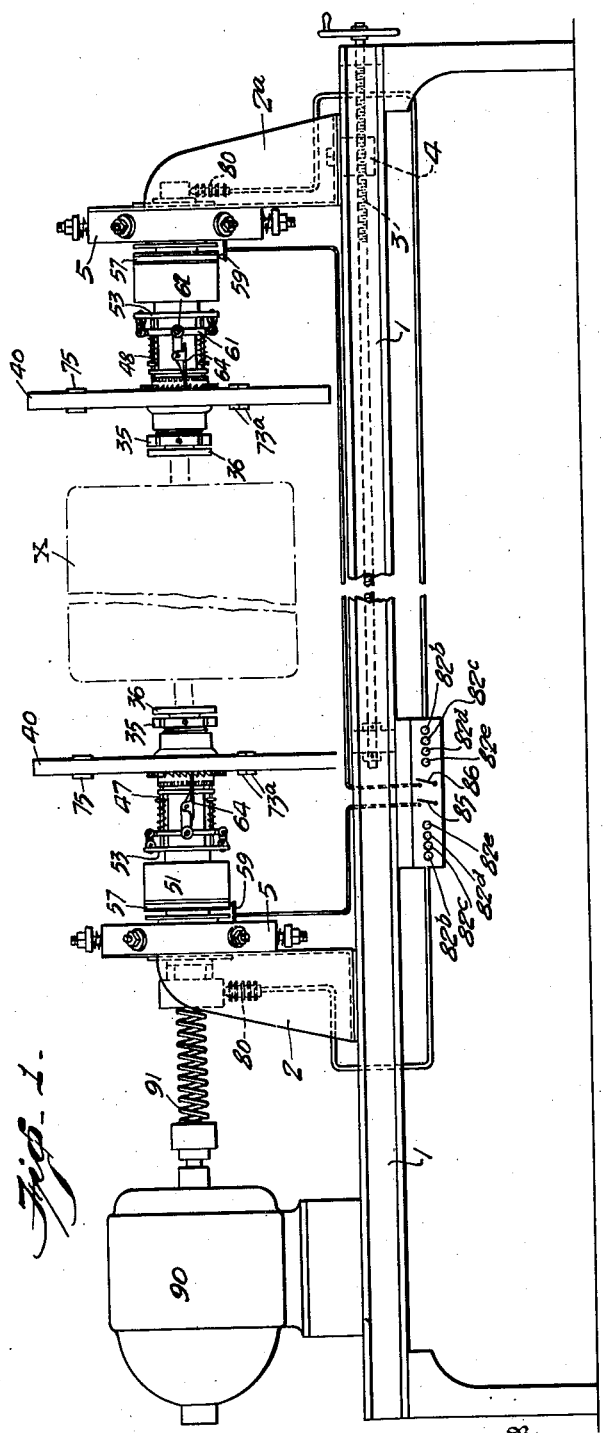
Fig. 1 is a side elevation of a balancing machine embodying the present invention.

The balancing machine in the preferred form and as shown in the present instance comprises a bed 1 which may be supported on legs as shown, this bed supporting the various parts of the machine, the machine comprising a pair of heads 2 and 2ª which are mounted on the bed, the head 2 being preferably bolted or otherwise fixed thereto and the head 2ª being adjustable endwise on the bed by a screw 3 which is mounted rotatably in and extends endwise of the bed and engages a nut or threaded lug 4 which is bolted to or otherwise fixed to the head 2ª.

The heads 2 and 2ª and the parts mounted thereon are preferably of like construction, so that illustration and description of one will suffice for both. Each head has a ring 5 bolted or otherwise fixed to its inner face, and within this ring is mounted yieldingly an inner ring 6, composed preferably of a light weight metal, within which is fitted the outer race of a ball or other anti-friction bearing 7, it being retained therein by inner and outer flanged plates 8 and 9, composed preferably of a light weight metal, which are secured to the opposite sides of the ring 6 by screws 10 and 11. The inner race of the bearing closely fits over a spindle 12, the spindles of the two heads serving to revolubly support the body to be tested. The inner ring 6 of each head is yieldingly supported in the outer ring 5, so that it may freely oscillate or vibrate therein under the influence of the rotating body supported by the spindles and while being tested, by an annular series of coiled compression springs 15 the inner ends of which bear on seats 16 formed in the circumference of the ring 6 and the outer ends of which bear against seats 17 formed in the inner sides of plugs 18 which are threaded in and adjustable radially of the outer ring 5, the series of springs 15 being adjusted by the plugs 18 to yieldingly center the inner ring 6 within the outer ring 5 and the adjustments of the plugs 18 determining the strength of the springs 15 and consequently the force required to displace the inner ring 6 from its central position. In order to adapt the machine to the testing of bodies of greater weight, an annular series of eye bolts 19 are attached at their inner ends to pins 19ª connected to the inner ring 6, these bolts extending outwardly through the springs 15 and plugs 18 and carrying supplemental springs 20 on their outer ends. These supplemental springs bear at their inner ends against seats on the outer sides of the plugs 18 and bear at their outer ends against collars 21 on the respective bolts 19, and the latter are threaded and provided with nuts 22 on their outer ends to bear against the collars 21 and thereby enable the supplemental springs to be adjusted to center the ring 6 within the outer ring 5 and to adjust the strength of the supplemental springs and consequently the force required to displace the inner ring 6 from its central position within the outer ring 5.

Each spindle 12 is formed with a tapered socket 30 similar to that of a drill socket, and the tapered socket of each spindle is adapted to receive an adapter 31 for the mounting of the respective ends of the shaft or mandrel of the rotatable body to be tested. Each of these adapters has a periphery which is tapered to correspond with the taper of the socket in the spindle, and is preferably cut out as indicated at 32 in order to lighten the weight of the adapter. Each adapter has an internal bore 33 of a size and shape to closely fit and receive an end of the shaft or mandrel which supports the body to be tested, such adapters being interchangeable in the sockets of the spindles so that the machine may be readily adapted for the testing of bodies supported by shafts or mandrels of different sizes and shapes. For example, for testing the armatures X of electric motors and generators the shafts of which are of different diameters, adapters having bores of corresponding sizes may be employed which may be fitted interchangeably in the sockets in the spindles. In order to facilitate the removal of an adapter from the spindle preparatory to the substitution of another adapter, the inner end of each spindle has a fixed collar 34 which is threaded externally to receive a nut 35, and the inner end of each adapter is formed with a collar 36 which is of greater diameter than the collar 34 and is adapted to be acted on by the nut 35 when the latter is unscrewed from the spindle, the nut thus acting to withdraw the adapter from the socket in the spindle sufficiently to enable the adapter to be further removed by hand. A set screw 37 may be threaded through the nut 35 and the collar 34 to clamp the adapter in place in the socket. The body X to be tested is mounted for example by the ends of its shaft upon which it is designed to rotate as an axis, by inserting the appropriate adapters in the respective spindles, the head 2ª being retracted for such purpose, and after the ends of the shaft of the body have been inserted in the respective adapters, the head 2ª is moved toward the other head 2, by rotating the screw 3, whereby the ends of the shaft of the armature or other body to be tested are supported by the spindles in the respective heads.

Each spindle has a balancing disk 40 mounted rotatably thereon. These balancing disks are composed preferably of aluminum to lighten their weight and thereby minimize their inertia and lighten the weight of the spindle assembly. As shown, each disk has a brass or other suitable bushing 41 fixed therein, this bushing abutting at one end against the collar 34 on the spindle, the other end of this bushing being formed with an annular series of notches 42. The portion of the hub of the disk surrounding the notches 42 is provided with a series of ratchet teeth 43 which correspond in number and location to the notches 42. A sleeve 44 of brass or other suitable non-magnetic material is fixed on the spindle to rotate with it and extends between the bearing retaining plate 8 and the notched end of the bushing 41, this sleeve thus serving to prevent axial displacement of the disk 40 from the collar 34, and this sleeve is provided with a pair of circumferential flanges 45 and 46 through which a pair of locking pins 47 reciprocates. One end of each locking pin is engageable in one or another of the notches 42, it being normally held yieldingly in engagement therewith by a spring 48 which may be coiled around the pin and may bear at one end against a collar 49 fixed to the pin and at its other end against the flange 46, the pin when in locking position, retaining the disk 40 against rotation on the spindle.

The present invention provides novel means, operable while the balancing machine is in operation and the body under test is rotating, to operate the pins 47 to unlock the disk 40 and to also rotate the disk on the spindle. Preferably and as shown in the present instance, such means comprises a solenoid 50 having a casing 51 which may be of metal and is fixed on the sleeve 44, as by its flange 52. The armature 53 of this solenoid, which is composed of iron or magnetic material, is provided with a sleeve 54 of like material which is mounted to slide axially on the sleeve into and out of the solenoid when the latter is energized and deenergized respectively, suitable spring means being provided for retracting the armature from the solenoid and for normally holding it yieldingly in retracted position. In the present instance, the locking pins 47 are threaded or otherwise fixed in the armature 53 so that the springs 48 will act to retract the armature, when the solenoid is deenergized, and to normally retain it yieldingly in retracted position. One end of the winding of the solenoid is grounded on the casing 51, as indicated at 55, and it is therefore grounded to the frame of the machine, and the other terminal of the winding of the solenoid is connected, as indicated at 56, to a conducting ring 57 which is insulated from the solenoid casing and the frame of the machine by mounting it in a ring 58 composed of insulating material, a brush 59 mounted on a spring attached to but insulated from the ring 6 serving to conduct electric current to the solenoid to energize it. The sleeve 44 also carries a pair of ratchet devices which may be of duplicate construction, each comprising a substantially semi-circular member or yoke 61 the ends of which are pivotally mounted on the flange 46 at diametrically opposite sides of the sleeve 44, by screws 62, as shown in detail in Fig. 5, whereby the ends of these pawl yokes are pivotally mounted coaxially. One end of each pawl yoke is provided with an arm 63 on which a ratchet pawl 64 is pivoted by a pin 65, each pawl being provided with a spring 66 which acts to retract it into a position to bring the tail 67 of the pawl against the arm 63. These pawls, located in relatively reversed relation at diametrically opposite sides of the sleeve 44, are positioned to cooperate with the teeth 43 at diametrically opposite sides of their center, and the pawl yokes are operatively connected to the solenoid armature 53 by links 70 whereby the pawls will operatively engage the teeth 43 and will rotate the disk 40 one step or notch each time the solenoid is energized, and the pawls will latch idly over the ratchet teeth 43 each time the solenoid is deenergized. In order to enable the disk 40 to be locked at each step in its rotation until the pawls act to rotate it, the links 70 are provided with lost motion slots 71 in which pivot pins 72 on the armature 53 operate. As shown in Fig. 2, the disk 40 is locked by the engagement of the locking pins 47 in the notches 42, the pivot pins 72 on the armature then occupying positions toward one end of the slots 70. When the solenoid is energized, the first part of the consequent movement of the armature 53 retracts the locking pins 47 from the notches 42, during which time the pins 72 move to the opposite ends of the slots 71, and the continued attraction of the armature then causes the links 70 to rock the pawl yokes 61 and to swing the pawls 64 in directions to rotate the disk 40 a step, by action on the ratchet teeth 43 which the pawls respectively engage. Upon deenergizing of the solenoid and retraction of its armature, the locking pins 47 first move into locking position in the next notches 42, during which operation the pawls are inactive due to the return of the pins 72 to the other ends of the slots 71, and continued retraction of the solenoid armature actuates the pawl yokes in directions to cause the pawls to latch idly over the ratchet teeth 43, preparatory to the next succeeding actuating operation of the pawls.

Each of the disks 40 carries a counterweight the effect of which is variable and thus may be adjusted to balance the unbalanced rotating body under test. Preferably and as shown in the present instance, such a weight 75 is provided which is slidable in a radial slot 76 formed in the disk at one side of its center, and a screw 77 having a shouldered inner end 78 rotatably mounted in the hub of the disk and extending through the periphery thereof is threaded through the weight and by rotation, serves to move the weight inwardly or outwardly in a direction radially of the disk. Outward displacement of the screw from the disk is prevented by a collar 79 which may be pinned or otherwise fixed on the screw to bear against the inner side of the periphery of the disk, and the outer end of the screw which is exposed at the periphery of the disk, may be provided with a slot 770 to receive a screw driver or otherwise adapted to receive a tool for rotating it to adjust the weight. A single weight may be employed on each disk, in which event the magnitude of the weight and of the weight of the screw are so proportioned that the disk will be balanced on all radii when the weight is set at the inner end of the slot. However, if desired, the slot may be duplicated on the opposite side of the disk, as indicated at 76ª so that the disk will be symmetrical, and removable weights 73ª may be mounted in the inner end of the slot 76ª so that when the adjustable weight 75 is located at the inner end of its slot, the disk will be balanced.

Figure 9:
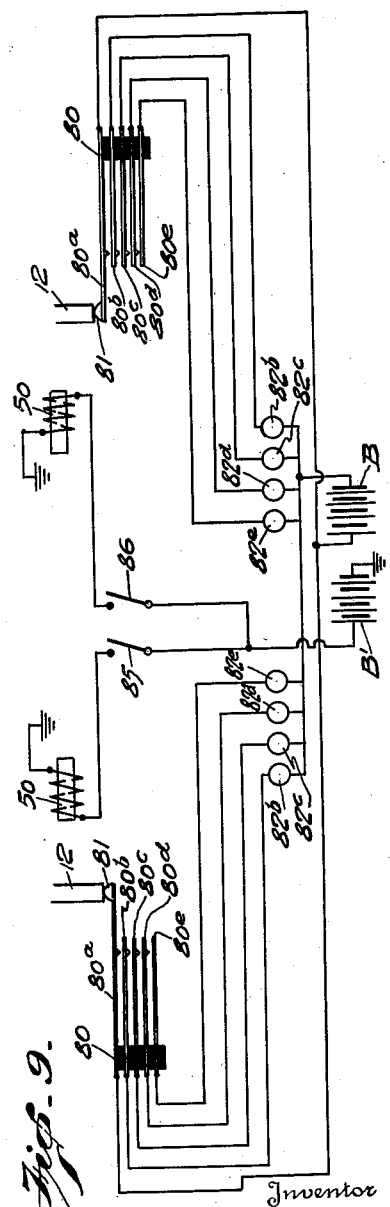
Fig. 9 is a diagram showing the electrical connections between certain elements of the machine.

The present invention provides means for indicating the degree of unbalance of the rotating body under test while the balancing machine is in operation, and preferably for indicating the degree of unbalance of the rotating body toward its respective ends. Such means, as shown in the present instance, comprises a multiple contact switch 80 for each of the heads 2 and 2ª, these switches being fixed to the respective heads and each switch comprising a series of contacts 80ª, 80ᵇ, 80ᶜ, 80ᵈ and 80ᵉ, all in close relation to but insulated from one another. The contact 80ª of each of these switches has a shoe 81 thereon arranged to ride on the spindle in the respective head 2 or 2ª so that when the respective spindle revolves truly on its center this contact and the other contacts of the respective switch will be out of engagement, but should either spindle revolve eccentrically of its center, more or less, the contact 80ª will be deflected correspondingly, causing one or more of the contacts to engage one another, depending on the degree of eccentricity of rotation of the respective spindle which, in turn, will depend upon the amount of unbalance of the rotating body under test toward the respective end thereof. Means are provided for indicating the degree of unbalance of the rotating body toward each end, visual means being provided in the present instance which comprises a set of electric lamps 82ᵇ, 82ᶜ, 82ᵈ and 82ᵉ which are connected to one side of a source of electrical energy B and to the contacts 80ᵇ, 80ᶜ, 80ᵈ and 80ᵉ respectively of the respective switch, it being understood that a set of these indicators is provided for the switch for each spindle. Electric lamps of different kinds may be used, but it is generally preferable to employ a neon or other known type of gas filled tubes or lamps in view of their instantaneous response to rapid closing and opening of their energizing circuits. The connections of the switches and indicating means may be as shown in Fig. 9, and this figure also shows diagrammatically the electrical connections for the solenoids 50 on the respective spindles, the windings of these solenoids, as previously stated, each having one terminal grounded on the frame of the machine, to which one side of a source of electrical energy B' is also grounded as indicated, and the other terminals of the solenoid windings may be individually connected to the other side of the source of electrical energy B' by individual switches 85 and 86, so that either one or both of the solenoids may be operated, according to the unbalanced condition of the body under test. The body under test is revolved by any suitable means, preferably an electric motor 90 which is mounted on the body 1 and connected to one of the spindles by a flexible driving connection such as a coil spring 91 the ends of which may be fixed respectively to the motor shaft and the respective spindle.

The operation of a balancing machine according to the present invention is as follows: The body X the dynamic balance of which is to be tested is mounted in the machine by fitting the ends of its shaft, or of a mandrel supporting the body when not provided with a shaft, tightly in the appropriate adapters with which the respective spindles are provided, so that said body and spindles will rotate together on a horizontal axis, setting the counterweight 75 of each balancing disk 40 at its innermost or disk-balancing position, and running the motor 90 to revolve the body X at appropriate speed. If the body is balanced dynamically, it will revolve true to the centers of the shaft or the geometrical axis on which it was designed to rotate, and consequently the spindles yieldingly supporting the respective ends of the body will revolve truly on their geometrical centers and none of the contacts of either of the switches 80 will be engaged and none of the indicating lamps will be illuminated, thus indicating that the body undergoing the test is dynamically balanced and no correction weights are required.

However, if the body X undergoing the test is unbalanced toward either or both ends, the spindles supporting the respective ends of the body will, because of their yieldable mountings, revolve eccentrically of their geometrical centers more or less, depending on the magnitudes of unbalance at the respective ends of the rotating body, due to the tendency of the rotating body to revolve about its center of mass as an axis, especially when the body under test is revolved at a speed in synchronism with the natural period of vibration of the unbalanced body. Such eccentric or off-center revolution of the spindles will cause deflection of the contacts 80ᵃ and the engagement of more or less of the other contacts of the respective switches 80, according to the degree of unbalance of the rotating body toward its respective ends, and a number of the indicating lights for each spindle, according to the number of contacts which are engaged thereby will be lighted, thus indicating immediately and directly the unbalanced conditions at both ends of the body under test. For example, if all four of the indicating lights for one of the spindles are illuminated and only two of the indicating lights for the other spindle are illuminated, such would indicate that the body under test is unbalanced to twice the degree at the former end than at the latter end.

The next step is to ascertain the radius of the body under test on which it is unbalanced. This is accomplished by adjusting the weights 75 outwardly on the disks 40, which puts these disks out of balance, and then revolving the body in the machine and, at the same time, successively closing and opening the switches 85 and 86 to successively energize and deenergize the respective solenoids 50, thereby causing the ratchet devices for both spindles, hereinbefore described, to rotate the balancing disks 40 until the weighted or heavy sides thereof are opposite to the heavy side of the body undergoing the test. When this adjustment of the balancing disks has been reached, such will be indicated by non-illumination of the indicating lights for both spindles, as would be the case if the balancing weights on the disks balanced the rotating body, or by illumination of a minimum number of the indicating lights for both spindles. In the latter event, the rotating body under test would still be out of balance, and in order to ascertain the amount of weight needed to balance the body, the weights 75 are further adjusted outwardly on the balancing disks and the body under test revolved, this operation being repeated, if necessary, until none of the indicating lights for either of the spindles becomes illuminated, thus indicating that the body under test is rotating in balance. The machine may then be stopped and a mark placed on the body on the radius thereof at which the balancing weight 75 is located and at the point along its length corresponding to its center of unbalance lengthwise, as indicated by the relative distances the balancing weights 75 have been moved outwardly on the respective balancing disks to bring the respective ends of the body to balance. The magnitude of the weight needed to balance the body is determined according to the sum of the distances of the weights 75 from the centers of the balancing disks and the distance from the center to the surface of the body to which the correction weight is to be applied to balance the body. The magnitude of such correction weight may be ascertained immediately and directly from the graduated scale S preferably provided on the respective balancing disks and with which the respective balancing weights 75 cooperate as indicators.

For example, the formula $$\begin{array}{ccc} P & F & W \\ \hline & A \quad \wedge \quad B & \end{array}$$

may be employed in which F represents the fulcrum of a lever having arms of the lengths A and B, P is the adjustable weight 75 of known value and W is the fixed weight 73ᵃ also of known value, from which is derived the equation $$P = \frac{W \times B}{A}$$

Assuming that the weight 75 is of 64 drams and that the graduations on the scale S (Fig. 3) are ¼ of an inch apart, that the fixed weight 73ᵃ and "0" on the scale S are each ⁸⁄₄ inches from the center of the balancing disk 40, and that the adjustable weight 75 is opposite to the graduation "14" on the scale, or ²²⁄₄ inches from the center of the balancing disk and balances an unknown weight in the armature or other body being tested, the formula may be employed first to find the true effective value of the adjustable weight, the equation being $$\frac{8 \times 64}{22} = 23\tfrac{3}{11}$$

Subtracting this from 64 drams, which is the weight of the fixed weight 73ᵃ, leaves 40⁸⁄₁₁ drams as the net value of the adjustable weight which counterbalances the unknown weight, 23³⁄₁₁ drams being used to counterbalance the fixed weight 73ᵃ. If the weight required to balance the armature is to be placed thereon at a point at the same radial distance from its center as that of the adjustable weight from the center of the balancing disk when opposite to the graduation mark "14" on the scale S (Fig. 3), the value of the weight to be added to the armature would be 40⁸⁄₁₁ drams. If the weight to balance the armature is to be added thereto at a radial distance of ¹⁶⁄₄ inches from its center, the equation is $$\frac{40\tfrac{8}{11} \times 22}{16} = 56 \text{ drams}$$

which is the value of the weight to be added to the armature, and if the weight is to be added to the armature at a radial distance of ²⁸⁄₄ inches from its center, the equation is $$\frac{40\tfrac{8}{11} \times 22}{28} = 32 \text{ drams}$$

which is the value of the weight to be added to the armature or other body under test. From the above formula and equations, the value of the weight to be added to the armature or other body being tested according to the radial distance from the center thereof at which the weight is to be applied or removed, as indicated by the reading of the scale S against the adjustable weight 75, may be readily determined. If it is found that the adjustable weight 75, when moved to its outermost position, is not sufficient to counterbalance the armature, the fixed weight 73ª may be removed, thus in effect, increasing the value of the adjustable weight 75 from 45⁵/₇ drams to 64 drams when in its outermost position opposite to the graduation "20" on the scale. By using a table prepared from the formula and equations given, the determinations of the magnitude of the weight required to be added to the armature or other body to balance it, according to the radial distance from the center thereof, may be read directly therefrom.

I claim as my invention:

1. A balancing machine comprising a pair of spindles for rotatably supporting a body for rotation, means yieldably supporting said spindles for rotation eccentrically of their centers under the influence of an unbalanced state of said body, and means including a series of elements spaced at different radial distances from the axis of each spindle and disposed along substantially the same radius, and a more or less number of which are actuated in response to different amounts of eccentricity of the respective spindle to indicate substantially the amount of unbalance of said body.

2. A balancing machine comprising spindles for rotatably supporting a body, means yieldably supporting said spindles and permitting deflection of said spindles under the influence of an unbalanced state of said body, and means including a cumulatively arranged series of elements superposed radially and spaced at different radial distances from the axis of each spindle and a more or less number of which are engageable with one another according to different extents of deflection of said spindles for indicating the degree of unbalance of said body.

3. A balancing machine comprising spindles for rotatably supporting a body, means yieldably supporting said spindles and permitting deflection of said spindles under the influence of an unbalanced state of said body, and means including a cumulatively arranged series of electrical contacts superposed radially and spaced at different distances radially of the axis of each spindle and a more or less number of which are engageable with one another by deflection of the respective spindle, and indicating devices operative by the respective contacts for indicating the degree of unbalance of said body.

4. A balancing machine comprising a spindle mounted rotatably and yieldably for displacement of all radii of its axis for supporting an end of a body the dynamic balance of which is to be tested, a member mounted on said spindle to rotate therewith and to also rotate relatively thereto and having a balancing weight adjustable radially to various positions thereon, means including an actuating solenoid carried by the spindle for rotating said member relatively to the spindle, and control means mounted in a stationary position relatively to said rotating means and connected electrically to said solenoid for controlling it.

5. A balancing machine comprising a rotatably mounted spindle for yieldingly supporting an end of a body the dynamic balance of which is to be tested, a member mounted on said spindle to rotate therewith and to also rotate relatively thereto and having a balancing weight adjustable radially thereon, means for locking said member to the spindle for rotation therewith, means for rotating said member relatively to the spindle, and means including a single solenoid common to said locking and rotating means for operating them to unlock said member, and to rotate and re-lock it.

6. A balancing machine comprising a rotatably mounted spindle for yieldingly supporting an end of a body the dynamic balance of which is to be tested, a member mounted on said spindle to rotate therewith and to also rotate relatively thereto and having a balancing weight adjustable radially thereon, a toothed element concentric with and attached to said member, means carried by the spindle and cooperative with said toothed element for rotating said member relatively to the spindle, means for locking said member to the spindle, a solenoid carried by said spindle and common to said rotating and locking means for operating them to successively unlock said member, rotate it and then re-lock it, and relatively stationary means connected to said solenoid for controlling its operation.

7. A balancing machine comprising means for yieldingly supporting at both ends and for rotating a body the dynamic balance of which is to be tested, a normally balanced disk associated with the supporting means for each end of said body, each of said disks having a balancing weight adjustable radially thereof, a toothed element concentric with and attached to each of said disks, pawl means mounted on said body supporting means and cooperative with the respective toothed elements for rotating the respective disks relatively to said body, means for locking each disk to its respective supporting means, a solenoid carried by each of said supporting means and common to the respective disk rotating and locking means for operating them, and relatively stationary switches connected to the respective solenoids for individually controlling them.

8. A balancing machine comprising a rotatably mounted spindle for yieldingly supporting an end of a body the dynamic balance of which is to be tested, a member mounted on said spindle to rotate therewith and to also rotate relatively thereto and having a balancing weight adjustable radially thereon, a solenoid carried by the spindle and having an armature, means actuated by said armature for locking said member to said spindle to rotate therewith and for unlocking it, and means actuated by said armature subsequent to each unlocking of said member for rotating said member step by step.

9. A balancing machine comprising means for yieldingly supporting at least one end and for rotating a body the dynamic balance of which is to be tested, a disk associated with said supporting means, said disk having a balancing weight adjustable radially thereon and a hub provided with sets of teeth, a pawl cooperative with one of said sets of teeth for rotating the disk relatively to the body, a locking pin cooperative with another of said sets of teeth for locking the disk in different positions of rotation, and actuating means common to said pawl and locking pin for operating them to successively unlock the disk, rotate it a step and lock it.

10. A balancing machine comprising a rotatably and yieldingly mounted spindle for supporting an end of a body the dynamic balance of which is to be tested, a balancing member carried by said spindle and rotatable relatively thereto, locking and ratchet teeth on and concentric with said member, reciprocatory locking pins supported on the spindle and cooperative with said locking teeth for normally locking said member to rotate with the spindle, pawls pivotally supported on the spindle and cooperative with said ratchet teeth for rotating said member, and actuating means carried by the spindle and common to said locking pins and pawls for operating them to sequentially unlock said member, rotate it a step and lock it.

11. In a balancing machine, the combination of a relatively fixed support, a spindle for supporting a body the dynamic balance of which is to be tested, and a yieldable mounting therefor comprising a series of main compression springs arranged radially of the axis of the spindle, a bearing for the spindle supported to yield in any radial direction by said springs, individually adjustable plugs in said support at the outer ends of said main springs for varying the strength of said springs, supplemental compression springs aligned respectively with said main springs and bearing at their inner ends against the outer sides of said plugs, and members connected to and extending radially from said bearing and connected to the outer ends of said supplemental springs for increasing the load sustaining capacity of the spindle.

DEMETRIOS K. POPE.